June 1, 1965 T. F. HAMM ETAL 3,186,747
DEADLOCKING LATCH FOR HOUSE TRAILERS
Filed Feb. 12, 1963 5 Sheets-Sheet 1

INVENTORS:
THEODORE F. HAMM,
DECEASED BY HIS EXECUTRIX,
MARJORIE L. HAMM
ALBERT S. LORD
BY
Beehler & Shanahan
ATTORNEYS.

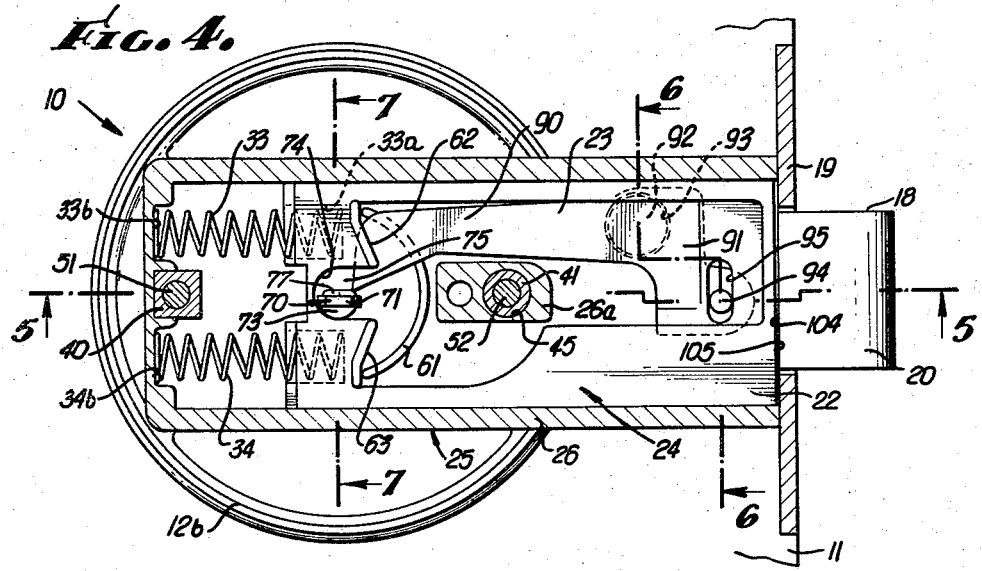
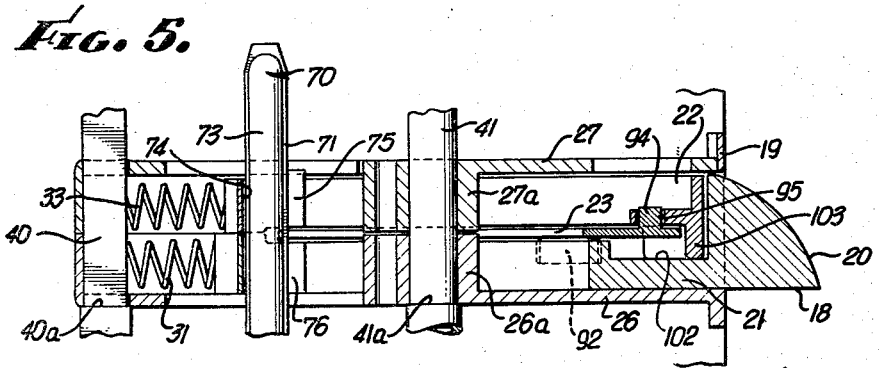
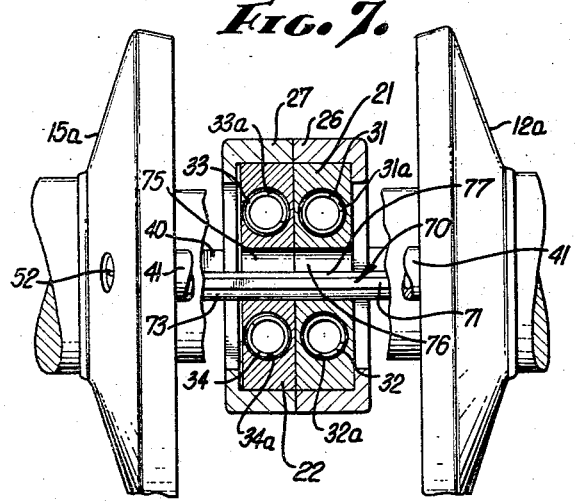
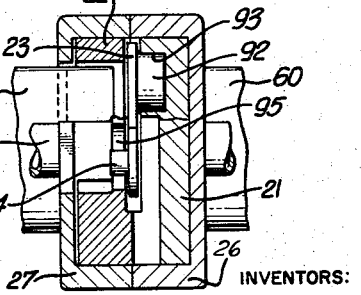
INVENTORS:
Theodore F. Hamm, Deceased,
BY HIS EXECUTRIX,
Marjorie L. Hamm
Albert S. Lord
By Beehler & Shanahan
ATTORNEYS.

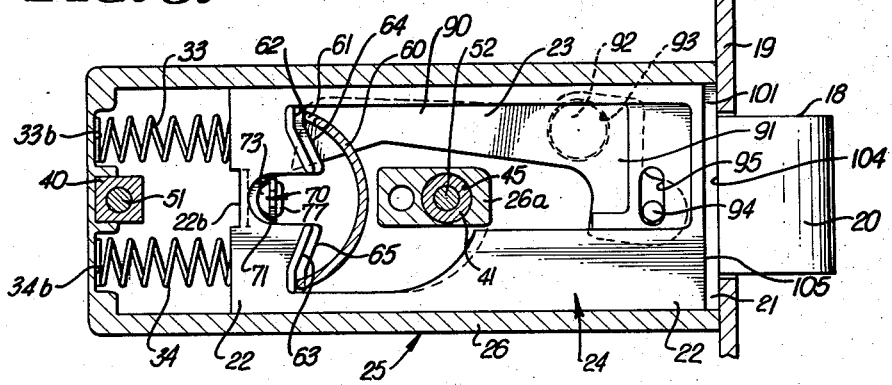
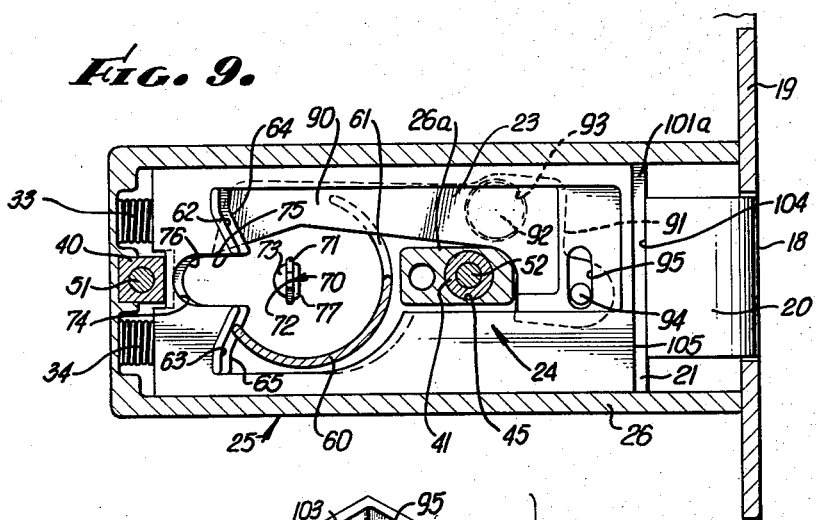
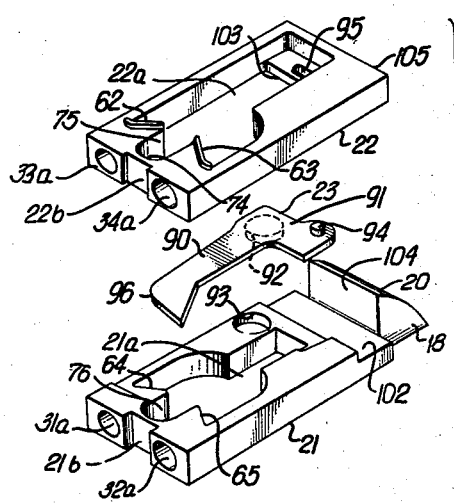
INVENTORS
THEODORE F. HAMM, DECEASED,
BY HIS EXECUTRIX,
MARJORIE L. HAMM
ALBERT S. LORD
BY
Beehler & Shanahan
ATTORNEYS.

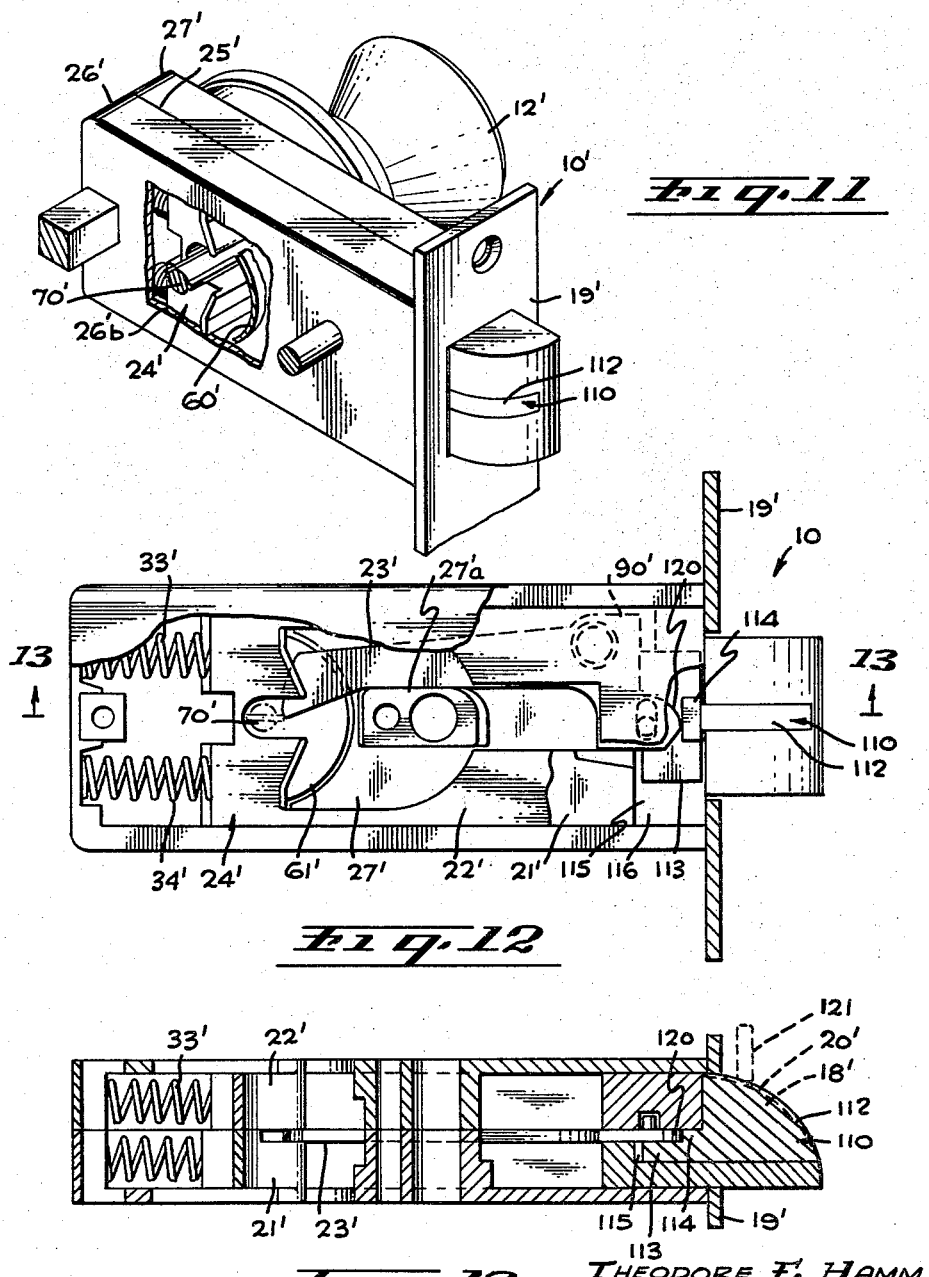

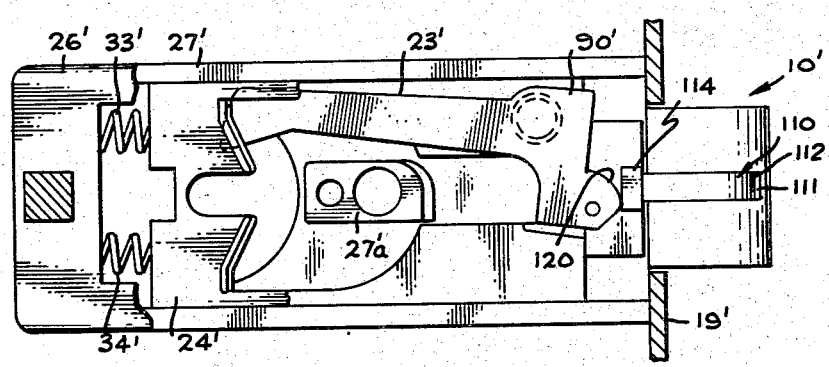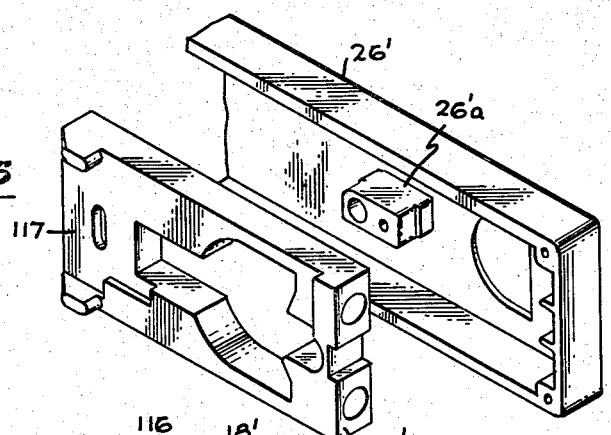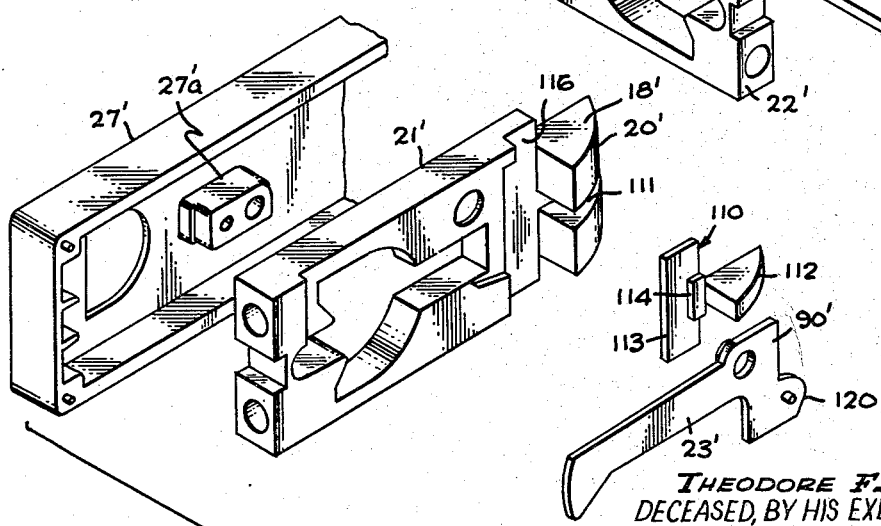

United States Patent Office 3,186,747
Patented June 1, 1965

3,186,747
DEADLOCKING LATCH FOR HOUSE TRAILERS
Theodore F. Hamm, deceased, late of Anaheim, Calif., by Marjorie L. Hamm, executrix, Anaheim, Calif., and Albert S. Lord, Long Beach, Calif., assignors to Tool Research and Engineering Corporation, Compton, Calif., a corporation of Delaware
Filed Feb. 12, 1963, Ser. No. 258,954
11 Claims. (Cl. 292—169)

This application is a continuation-in-part of our application, Serial No. 106,681, filed May 1, 1961, and now abandoned, for "Deadlocking Latch for House Trailers," as to all common subject matter found therein.

This invention relates generally to deadlocking latches having the characteristics required in house trailers of being proof against working open during highway transport and also panic-proof against imprisoning the occupants of a trailer under emergency conditions. More particularly, the invention is concerned with such a deadlocking latch in which deadlocking is accomplished by a bell-crank dog which can be locked from deadlocking position by rotation of the inner knob without unlocking the latch or rotating the locking spindle from locked position.

House trailers are subjected to many unusual conditions during transport and use which impose special requirements, which are not necessarily demanded for latches intended for use in ordinary stationary buildings.

During transport of a house trailer over a highway, there is a tendency for both door latches to jiggle free, permitting the trailer door to swing open and be subject to possible damage. This difficulty is particularly likely to be encountered if the highway has even a modest amount of roughness and the house trailer is transported at usual highway speeds. It also occurs in house trailers which are so large as to be subject to significant deformation during transport.

House trailers are often set up on sites which are not perfectly level to start with, or which soon lose their level characteristics under the weight of the house trailer. A distortion slowly occurs in the house trailer body so that the door eventually reaches a point at which any jar may cause it to spring open by release of the latch.

House trailers require somewhat better latches than ordinary stationary houses, since they are sometimes parked on a public street where they are more exposed to theivery than a house. Also, in the familiar conditions of a trailer camp, many close neighbors may invade the privacy of a house trailer unless it is deadlocked in a manner which does not yield readily to lock opening.

Often house trailer windows are too small, so far as their movable parts are concerned, to permit escape by a human being through the windows. Consequently, it is especially important that the doors open readily from the inside in the case of fire or other emergency, and permit the escape of persons inside, even if those persons are under emotional stress which prevents them from reacting reasonably and applying a key or other means to open a lock of complex operation.

Although various deadlocking latches have been devised in the past, almost none of these suited for house trailer use has been of such a character as to be panic-proof.

It is, therefore, a major object of the present invention to provide a deadlocking latch for house trailers which instantly opens from the deadlocked position, from the interior of the trailer, regardless of the position of the locking turn button, or the dead-locked and bolted disposition of the locked parts.

It is a further object of the invention to provide a deadlocking latch of the type described in which opening can be accomplished from the interior of the trailer without rotation of the locking spindle, and regardless of whether or not it may be jammed against rotation by a jammed exterior key or the like.

At the same time, it is an important object of the invention to provide a deadlocking means which is very strong and resistant to picking, and so positive in operation that it cannot be pried open by pressure on the latch bolts.

The foregoing and other objects of the invention are accomplished by means of co-operative action between a deadlocking dog which swings in a vertical plane parallel with the latch bolt, and can be rotated from deadlocked position to open position by a cam system operated by the interior knob only.

The objects above described, and other objects of the invention, and the application of the principles of the invention will best be understood from the following description of one specific embodiment, taken in connection with the accompanying drawings, but it will be understood that the invention is by no means restricted to the details described, and that it may be utilized with modifications of form which incorporate the same bell-crank dog action, in a latch having split knob spindles, the interior spindle having an operation different from the exterior one, so far as the locking dog is concerned.

In the drawings:

FIGURE 4 is an enlarged vertical sectional view similar to FIGURE 2, but showing the locking spindle rotated to unlocked position;

FIGURE 5 is a view upwards from below of a horizontal section taken through the lock at a stepped surface indicated by the arrows 5—5 in FIGURE 4;

FIGURE 6 is a vertical sectional view as viewed at the stepped plane indicated by the line and seen in the direction of the arrows 6—6 in FIGURE 4;

FIGURE 7 is a vertical sectional view of the spring mechanism of the lock as viewed at the plane and in the direction of the arrows indicated by the numeral 7—7 in FIGURE 4;

FIGURES 8 and 9 are views similar to the view of FIGURE 4 but showing the lock in locked position and in retraction without rotation of the locking spindle, respectively;

FIGURE 10 is an exploded assembly view of the bell-crank dog and the inner and outer retractor slides which make the panic-proof action of the deadlocking latch possible;

FIGURE 11 is a perspective view, from the outdoor side, of a preferred form of the invention in which a deadlock-releasing dog is recessed into the face of the bolt;

FIGURE 12 is an elevational view of the lock of FIGURE 11, seen from the interior side, with part of the housing broken away to reveal the internal construction of the lock, and the disposition of its parts when the lock is in a deadlocked condition;

FIGURE 13 is a view upwards from below of a horizontal section taken through the lock at a horizontal plane indicated in FIGURE 12 by the arrows 13—13;

FIGURE 14 is an interior side elevational view corresponding to FIGURE 12, except that the parts of the lock are shown as they are disposed when deadlocking has been released by the inward displacement of the deadlock-releasing dog characteristic of this embodiment of the invention;

FIGURE 15 is a perspective view of the interior housing, seen from the inside, and the interior retraction slide; and FIGURE 16 is an exploded perspective view of the exterior half of the lock housing, the exterior half of the retraction slide, the deadlock-releasing dog, and the deadlocking dog.

Figure 1:
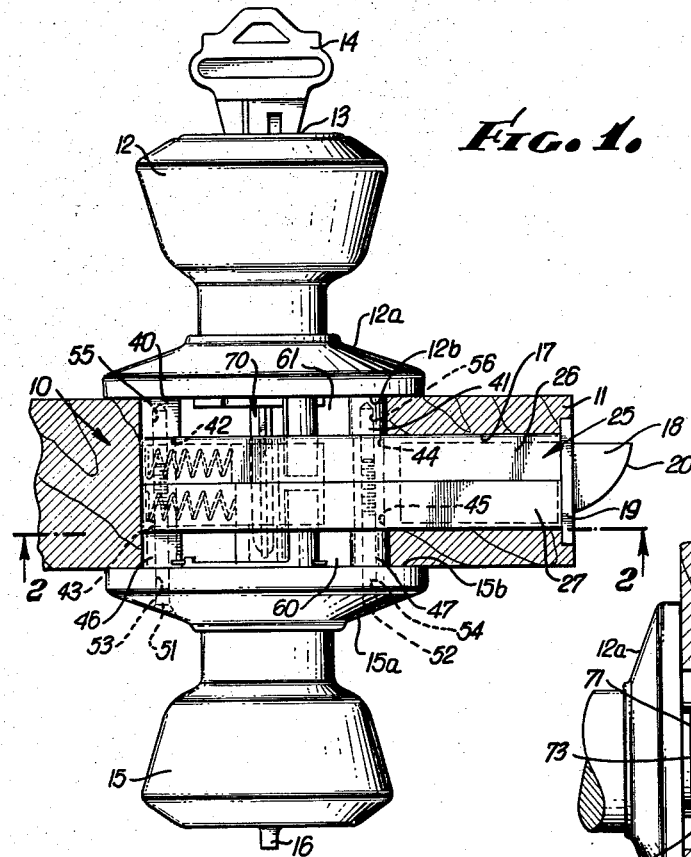
FIGURE 1 is a plan sectional view at a horizontal plane through a trailer door showing a specific embodiment of the latch of the invention mounted in position of the trailer door.

In FIGURE 1, the arrow 10 indicates generally a latch or lock mechanism constructed according to the invention. It is seen that latch 10 is mounted in a door 11 and is operated from the exterior by an exterior knob 12 having a key hole at 13, in which a key 14 is shown inserted. An interior knob 15 is shown on the interior side of door 11 and is provided with a turn button 16 for locking or unlocking latch 10 from the interior of the house trailer or other structure in which the door 11 is mounted.

The latch mechanism 10 is housed in a recess 17 within door 11, with a latch bolt 18 projecting through the opening in a face plate 19.

The cam surface 20 of the latch bolt 18 reveals that the door 11 is outward swinging, since cam surface 20 must glide over the outer edge of the catch plate (not shown) mounted in the door frame (not shown) when the door 11 closes.

The latch bolt 18 is seen from FIGURE 10 to be an integral part of an outer retractor slide 21, which mates with an interior retractor slide 22 and carries a deadlocking dog 23 in a retractor assembly indicated generally by the numeral 24.

Retractor assembly 24 is closely received in a housing 25, which may be conveniently assembled of outer and inner halves 26 and 27, respectively.

Retractor assembly 24 is retractable into housing 25 against the resilient pressure of four coil springs 31, 32, 33, and 34, seen in end view in FIGURE 7. FIGURES 8 and 9 show the retractor assembly 24 in a latching and retracted, unlatching positions, respectively; the springs are compressed by retraction, as seen in the change from extended to retracted positions for springs 33 and 34, in FIGURES 8 and 9, respectively. Springs 31 to 34 are retained in position by seating recesses 31a to 34c in inner and outer retractor slides 22 and 21, and by mating the recesses 31b to 34b in the end wall of the housing 25.

The knob assemblies 12 and 15 are conventional in construction and appearance. The rosette 12a of exterior knob 12 reveals no screw holes; its inner face 12b is provided with a pair of index posts, a square index post 40, and a round index post 41, which pass through the mating index openings 42 to 45, being received in index sleeves 46 and 47, which project into the latch recess 17 from the back face 15b of the interior rosette 15a. The entire assembly is screwed together by means of a pair of screws 51 and 52 which are inserted through holes 53 and 54 in the interior rosette 15a and are threadedly received in threaded bores 55 and 56 in the index posts 40 and 41.

Figure 3:
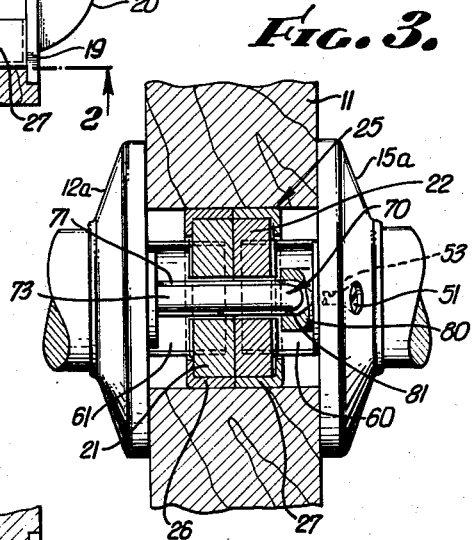
FIGURE 3 is a vertical sectional view taken through the latch transversely through the trailer door at the plane indicated by the arrows 3—3 in FIGURE 2.

FIGURE 3 shows a vertical side wall of the inner housing half 27. Index posts 40 and 41 and assembly screws 51 and 52 are seen in cross section where they are positioned in the close fitting locating openings 43 and 45 in the vertical side wall of inner housing half 27. It will be noted, however, from the perspective views of the outer retractor slide 21 and the inner retractor slide 22, as seen in FIGURE 10, that the two retractor slides are provided with longitudinal slots 21a and 22a so that the immovable index post 41 does not interfere with their retraction movement.

In FIGURE 5, the horizontal sectional view looking upward reveals that the interior surface of inner housing half 27 is provided with an inwardly projecting boss 27a, and the inner surface of outer housing half 26 with the mating boss 26a, which provide firm reception for the round indexing post 41.

Figure 2:
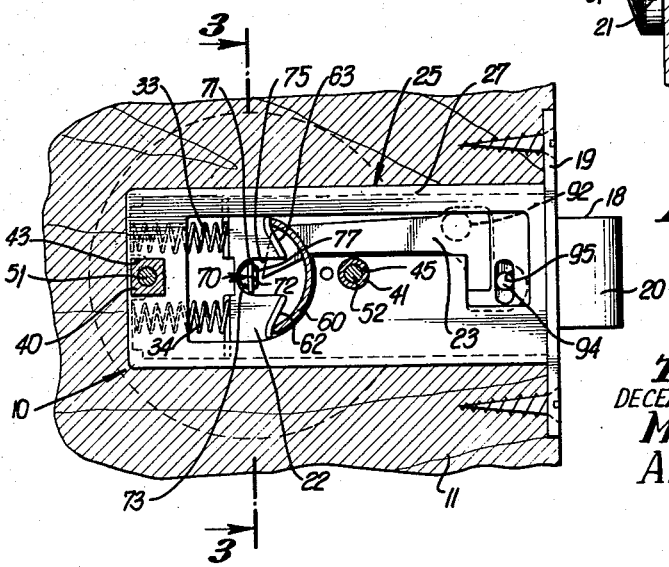
FIGURE 2 is a vertical sectional view parallel with the main surfaces of the trailer door but taken through the door along the line indicated by the arrows 2—2 in FIGURE 1.

Also, it will be seen from FIGURES 2 and 5 that the square indexing post 40 is located at an elevation between the upper springs 31 and 33 and the lower springs 32 and 34, so as not to interfere with their movement. Furthermore, the inside ends of retractor slides 21 and 22 are notched at 21b and 22b, respectively, so that they may be fully retracted without engaging the square indexing post 40.

FIGURE 5 further reveals that both square indexing post 40 and round indexing post 41 are provided with shoulders 40a and 41a which seat against outer housing half 26.

It will be seen from the foregoing description that the particular embodiments illustrated in the drawings does not permit much adjustment for door thickness, nor is it suited to reversible mounting. However, neither of these features is of any importance in the application for which the invention is intended. House trailer doors have a standard thickness which varies only slightly at the maximum. House trailer doors are universally mounted so as to open outwardly, and the latch of the invention is intended primarily for outside door use, and not for interior uses in which reversibility might be required.

When the lock 10 is in an unlocked condition, the retractor assembly 24 may be retracted from the latched position shown in FIGURES 2, 4, 5, and 8 to the retracted position of FIGURE 9 by turning either exterior knob 12 or interior knob 15. As seen in FIGURE 3, looking from the inside of the lock outward towards the face plate 19, each of the two knobs is provided with a half spindle of arcuate shape approximating a half of a cylinder divided on an axial plane. The interior knob spindle 60 is seen in FIGURE 3 in elevation, and in FIGURES 2, 8 and 9 in cross section. The exterior knob spindle 61 is seen in elevation in FIGURE 3 and in end view in FIGURE 4.

Spindle 60 engages only the inner retractor slide 22, engagement being by sliding contact between an edge of the spindle 60 and either lower retractor cam surface 62 or upper retractor cam surface 63, on inner retractor slide 22, depending on whether the interior knob 15 is rotated clockwise or counter clockwise; in either case, inner retractor slide is engaged, and the entire retractor slide assembly 24 is moved to the left to retracted position as viewed in FIGURE 9.

Similarly, when the lock 10 is in an unlocked condition, rotation of the exterior knob 12 causes arcuate spindle 61 to engage upper retractor cam surface 64 or lower cam surface 65, thereby moving outer retractor slide 21, and with it the entire retractor slide assembly 24, to the unlatched position shown in FIGURE 9.

Locking is accomplished by means of a locking spindle 70, seen in a locked position in FIGURES 1, 2, 3, 8, and 9, and in an unlocked position in FIGURES 4, 5, and 7. Locking spindle 70 is seen to approximate a half-cylindrical shaft. In the embodiment of the invention illustrated, the locking spindle 70 has been shaped in a preferred manner to provide maximum strength and smoothness of operation. The end view of FIGURE 2 and the side view of FIGURE 3 reveal that it is provided with longitudinal flanges 71, which lie in a plane through the axis 72 of locking spindle 70. The back of the spindle 70 is provided with a longitudinal shoulder 73 of half-cylinder cross section, which rotates smoothly against the semi-circular bottom 74 of horizontal slot 75 in inside retractor slide 22. Outer retractor slide 21 is similarly slotted at 76 as seen in FIGURES 8 and 9. The front of the locking spindle 70 is provided with a longitudinal camming shoulder 77, which is slightly convex, but much smaller than the cylindrical back shoulder 73.

The locking spindle 70 can be rotated from the locked position, with flanges 71 in a vertical plane, as seen in FIGURES 1 to 3, to an unlocked position, with the flanges 71 in a horizontal plane as seen in FIGURES 4 and 5, or vice versa by rotation of the key 14 from the exterior or by rotation of turn button 16 from the interior. The exterior knob 12 contains a conventional lock tumbler mechanism which is rotatable co-axially with knob 12, and independently thereof, to position locking spindle 70 in either the locked position of FIGURES 1 to 3 or the unlocked position of FIGURES 4 and 5.

Turn button 16 rotates a shaft 80, seen partially broken away in FIGURE 3, which rotates co-axially with interior knob 15 and independently thereof. The end of shaft 80 projecting into the interior of the lock mechanism 10 is provided with a hole 81 seen in dashed outline in FIGURE 1 and in the broken away portion of shaft 80 in FIGURE 3. Hole 81 closely receives the end of shaft 70, when the latter is assembled onto the door 11, as seen in FIGURE 3, and being of semi-circular cross section with the axis of its semi-circular section in a plane passing through axis 72 of shaft 70, turn button shaft 80 is compelled to rotate integrally with the rotation of the locking spindle 70.

Locking action is accomplished by engagement between deadlocking dog 23 and locking spindle 70, by rotation of the latter.

It will be seen in FIGURE 10 that dog 23 is assembled between the outer retractor slide 21 and the inner retractor slide 22. Dog 23 has a lever arm 90, and at an angle therewith, a crank arm 91. The exterior side of dog 23 is provided with a cylindrical projection which serves as a fulcrum 92, which is received in a fulcrum board 93 in the inner side of exterior retractor slide 21. Thus, in assembly the dog 23 is rotatably mounted on outer retractor slide 21 between the two retractor slides 21 and 22.

The interior face of the dog 23 is provided with an inwardly projecting cam button 94 on the end of crank arm 91. Cam button 94 is received in a vertical cam button slot 95 in the inner retractor slide 22, and is adapted to move vertically in said cam button slot under conditions to be described hereinafter.

The end of lever arm 90 is provided with a detent cam surface 96, which projects into the lock recess 17 and engages the cam shoulder 77 on locking spindle 70 when the latter is rotated to vertically oriented locking position as illustrated in FIGURES 1 to 3. Since the locking dog 23 reciprocates as a unitary assembly with the two retractor slides 21 and 22, it will be seen that the latch bolt 18 cannot be retracted by exterior knob 12 or by attempts to insert a jimmy instrument against latch bolt 18 from the exterior side.

When the locking spindle 70 is rotated to the horizontally oriented position illustrated in FIGURES 4 and 5, the detent end 96 of locking dog 23 is free to ride over the cam shoulder 77 for retraction into the retracted unlatched position of FIGURE 9.

An important feature of novelty of the invention is the manner in which the retractor slide assembly 24 operates to permit unlatching of the lock 10 by rotation of the interior knob 15, without rotation of the locking spindle 70 from locking position to unlocking position. Such unlocking, without reference to unlocking by means of the turn button 16, is necessary to make certain that mere rotation of the interior knob 15, without any understanding of the function of turn button 16, will enable one to escape from the interior of the house trailer in which the door 11 is mounted under emergency conditions.

The sequence of operation of unlatching with the locking spindle 70 in locked position may be observed in FIGURES 2, 8, and 9.

When the locking spindle 70 is disposed vertically, i.e., in a locking position, as illustrated in FIGURE 2, the locking dog lever arm 90 is dropped into a rest position on the upper surface of the indexing stud boss 26a, which projects inwardly from the side wall of housing half 26 (see FIGURE 5). With the retractor slide assembly 24 in a fully extended position, as in FIGURE 2, the detent cam surface 96 is seen to be spaced a short clearance space 100 from the adjacent cam surface 77 of locking spindle 70. Also the cam button 94 is at its highest point of travel in cam slot 95.

FIGURE 8 illustrates the disposition of parts when interior knob 15, together with its associated arcuate half spindle 60, has been rotated a few degrees in a clockwise direction so as to move inner retractor slide 22 a short distance to the left, before any retraction of outer retractor slide 21 has occurred. It will be seen that inner retractor slide 22 is retractable independently of outer retractor slide 21 by a short distance, typically a fraction of an inch, indicated in FIGURE 8 at 101; this short independent relative displacement between retractor slides 22 and 21 may be referred to as the dog-operating displacement.

FIGURE 8 also reveals that the dog operating displacement 101 of interior retractor slide 22, while exterior retractor slide 21 remains stationary, produces clockwise rotation of the dog 23 from the deadlocking position illustrated in FIGURE 2 to the unlocked position illustrated in FIGURES 8 and 9. The outer wall of cam slot 95 engages cam button 94 and forces it to move inward and slightly downward in an arcuate swing about the axis of the fulcrum 92. It will be recalled that fulcrum 92 is mounted in the exterior retractor slide 21, and, therefore, does not experience any inward translation during the initial dog-operating displacement 101 of inner retractor slide 22.

The small clearance 100 between the detent end 96 of the dog 23 and the cam shoulder 77 on the locking spindle 70 allows the detent end 96 to swing upwardly and out of engagement with the locking spindle 70 during the cam operating displacement 101.

It will be seen from FIGURE 9 that the relative displacement between inner retractor slide 22 and outer retractor slide 21 persists throughout retraction by the interior knob 15 all the way to full retraction, as indicated at 101a, where the outer retractor slide 21 and its accompanying latch bolt 18 are seen to be slightly lagging the inner retractor slide 22 in retraction movement.

The persisting dog-operating displacement 101a serves to maintain the dog 23 in its lifted and unlatched position, as illustrated in FIGURES 8 and 9.

When the locking spindle 70 is in an unlocked position as illustrated in FIGURE 4, the retractor assembly 24 can be retracted to full retraction position without the lifting of dog 23 and without any cam operating displacement 101, since the detent end 96 of dog 23 easily rides over the cam surface 77 on the horizontally disposed locking spindle 70.

Exterior retractor slide 21 and interior retractor slide 22 are provided with a pair of overlapping shoulders 104 and 105, respectively, which are exposed transversely to the direction of retraction movement, and cause engagement between exterior retractor slide 21 and interior retractor slide 22, so that the two are transported together without any relative displacement, when unlatching bolt 18 is accomplished by turning exterior knob 12 through a rotation which is counterclockwise as viewed from the exterior of door 11. It will be obvious that it is necessary for the engaging shoulders 104 and 105 to be spaced from one another in such a manner as to permit the dog-operating displacement 101 of interior retractor slide 22 to occur when unlatching is to be accomplished by rotation of interior knob 15. Thus, in the embodiment illustrated, cam surfaces 63 and 65 are spaced from one another a distance which exceeds the spacing of the shoulders 104 and 105 by the displacement distance 101.

FIGURES 11 to 16 illustrate a second and preferred embodiment of the invention, indicated generally by the numeral 10′, and having many parts corresponding to the embodiment described in connection with FIGURES 1 to 10. Parts in the second embodiment in FIGURES 11 to 16, which correspond to, or are identical with, parts already described in connection with FIGURES 1 to 10, are identified by prime numerals corresponding to the identification numerals used in FIGURES 1 to 10.

The significant difference in the second embodiment, 10′, is that it includes a deadlock-releasing dog 110, seen in assembly in FIGURE 11, and in isolation in FIGURE 16. The purpose of the deadlock-releasing dog 110 is to momentarily disengage the deadlocking-dog 23′ in the special case when an open door is slammed shut with the lock 10′ in a deadlocked position. The purpose of this feature and its mode of operation will be made apparent from the following detailed description.

In the perspective view of FIGURE 11, an exterior knob 12′ is illustrated, but the interior knob has been omitted from the illustration for purposes of this disclosure. It will be understood that the lock of embodiment 10′ employs an interior and exterior knob construction, and a housing 25′, having interior and exterior halves 26′ and 27′, identical with the corresponding parts to the embodiment of FIGURES 1 to 10.

The side of inner housing half 26′ is broken away at 26′b to partially reveal the interior of the lock 10′. It will be seen from the revealed portions of lock 10′, in FIGURES 11 and 12, and the components shown in perspective in FIGURES 15 and 16, that lock 10′ contains all parts found in lock 10, and these parts perform exactly the same function as in lock 10.

Thus, lock 10′ has a retractor assembly 24′, which includes an outer retractor slide 21′, an inner retractor slide 22′, and a deadlocking dog 23′, which is rotatably mounted between the two retractor slides 21′ and 22′.

In FIGURES 15 and 16, the face plate 19′ (illustrated in FIGURES 11, 12, and 13) is broken away for purposes of illustration, but it is seen that the interior construction of these two parts corresponds exactly with the interior construction of housing halves 26 and 27, and like them is provided with bosses 26′a and 27′a.

The retractor assembly 24′ is urged outwardly by four coil springs exactly in the same manner as in the embodiment of FIGURES 1 to 10, springs 33′ and 34′ being seen in FIGURE 12.

The operation of the locking spindle 70′ and of the roll-over type spindles associated with the interior and exterior knob, indicated by the numerals 60′ and 61′, respectively, are identical to that of spindles 70, 60, and 61, in both construction and operation, so that description of these need not be repeated.

Exterior retractor slide 21′ is slightly modified in order to accommodate the deadlock-releasing dog 110. It is seen from the exploded perspective view of FIGURE 16 that the cam surface 20′ of latch bolt 18′ (which is an integral part of the exterior retractor slide 21′) is slotted with a horizontal slot 111 to closely receive a striking member 112 of deadlock-releasing dog 110.

Deadlock-releasing dog 110 also has a slide member 113, and a dogging member 114, which are integral with striking member 112, to form the deadlock-releasing dog 110.

The deadlock-releasing dog 110 is reciprocable in the slot 111 and in the recess 115, seen in horizontal cross section in FIGURE 13, and formed between the retractor slides 21′ and 22′, by recessed portions 116 and 117, respectively.

Normally, as may be seen from FIGURES 12 and 13, the deadlock-releasing dog 110 is urged outwardly, by the spring action of springs 33′ and 34′, which urge the exterior retractor slide 21′, together with the deadlocking dog 23, which it transports, outwardly so as to bring a releasing cam surface (see FIGURE 12) 120, on the lever arm 90′, in contact with the dogging member 114 of deadlock-releasing dog 110. In this outwardly-urged position, deadlock-releasing dog 110 protrudes slightly from the striking surface 18′, as may be seen in the horizontal sectional view of FIGURE 13. The protrusion is very slight but sufficient to produce deadlock-releasing action, as will be described by comparison of FIGURES 12 and 14.

For the purpose of understanding the following explanation of the lock 10′, assume that the lock is in a deadlocked condition, as illustrated in FIGURE 12, while mounted in an outward swinging trailer door (not illustrated). Assume that the door is slammed so that the striking surface 18′, and the striking member 112 of deadlock-releasing dog 110 move violently against the edge of a striker plate, indicated in dashed outline at 121 in FIGURE 13. When this occurs, the striker member 112 encounters striker plate 121 slightly in advance of the striking surface 18′, and the contact causes the inward displacement of the deadlock-releasing dog 110 to the position indicated in FIGURE 14.

Inward displacement of the deadlock-releasing dog 110 causes it to slide inwardly in the slot 111, and the recess 115, with the dogging member 114 engaging the deadlock-releasing cam surface 120, and rotating the deadlocking dog 23′ in a clockwise direction (as viewed in FIGURE 14) to accomplish deadlock releasing.

The deadlock release which thus occurs, permits the smooth and resilient retraction of the slide assembly 24′, against the action of springs 33′ etc., as striking surface 18′ engages striker plate 121.

Jar and shock to the lock components is thus avoided despite the fact that someone has slammed the door without using the door knob and rotating one of the knob spindles 60′ or 61′.

As soon as the door is closed, the springs 33′ etc. expel the retractor slide 24′, the latch bolt 18 being received in a latching recess (not illustrated), and the lock 10′ once again assumes a deadlocked position.

It will be seen that the use of the deadlock-releasing dog 110 provides the desirable feature that the lock 10′ is not subjected to shock and danger of breakage by virtue of careless slamming of the door with the lock 10′ in a deadlocked position.

The foregoing description has presented in detail two preferred specific embodiments of our novel deadlocking latch for house trailers, but it will be understood that the scope of the invention we claim is not restricted to the details illustrated in these embodiments, but is intended to include all variations, modifications, and improvements which fall within the scope and spirit of the claims appended hereto.

Having described the invention, what is claimed as new in support of Letters Patent is:

1. A deadlocking door latch mechanism which includes: a housing for mounting in a door near the swinging edge thereof; a face plate closing said housing at the edge of said door, said face plate having a bolt opening; a locking spindle passing transversely through said door and said housing between the interior and exterior sides thereof, said locking spindle being rotatable between locking and unlocking positions; a retractor slide assembly reciprocably slidable within said housing to and from said face plate, and comprising an interior retractor slide toward the interior of said door, an exterior retractor slide toward the exterior of said door, and a deadlocking dog movably mounted in said retractor slide assembly, and movable to and from a locking position engaging said locking spindle; spring means urging said retractor slides toward said face plate; a bolt carried on one of said retractor slides; and dog operating means to move said locking dog from locking to unlocking position, said dog operating means being operated by a relative longitudinal movement between said exterior and interior slides; mating overlapping shoulder means between said interior retractor slide and said exterior retractor slide transverse to the direction of retraction movement, and spaced from one another sufficiently to permit said relative longitudinal movement of said slides to achieve said dog release movement.

2. A deadlocking door latch mechanism which includes: a housing for mounting in a door near the swinging edge thereof; a face plate closing said housing at the edge of said door, said face plate having a bolt opening; a locking spindle passing transversely through said door and said housing between the interior and exterior sides thereof, said locking spindle being rotatable between locking and unlocking positions; a retractor slide assembly reciprocably slidable within said housing to and from said face plate, and comprising an interior retractor slide toward the interior of said door, an exterior retractor slide toward the exterior of said door, and a deadlocking dog rotatable in a plane transverse to said locking spindle between said pair of retractor slides, said deadlocking dog being pivotally mounted in said exterior retractor slide and in deadlocking engagement with said locking spindle when the latter is in locked position; spring means separately urging each of said retractor slides toward said face plate; a bolt carried on one of said retractor slides and movable therewith between a latching position with said bolt projecting through said bolt opening, and an unlatched position with said retractor assembly retracted into said housing against said spring means; dog operating means on said interior retractor slide to rotate said locking dog from deadlocking position to release position when said interior retractor slide is retracted a short distance relative to said exterior retractor slide; mating overlapping shoulder means between said interior retractor slide and said exterior retractor slide transverse to the direction of retraction movement, and spaced from one another sufficiently to permit said relative longitudinal movement; and interior spindle means operable from inside said door and adapted to retract said interior retractor slide to unlatching position.

3. In a door lock set for mounting in a door, with interior and exterior knob means and locking means for locking said lock set against unlatching, an improved deadlocking door latch mechanism operable by said interior door knob means while said door lock set is in a locked condition, which improvement includes: a housing for mounting in said door near the edge thereof; a locking spindle passing transversely through said door and said housing between said interior and exterior knob means, said locking spindle being rotatable independently by either knob except when locked by said locking means; a face plate closing said housing at the edge of said door, said face plate having a bolt opening; a retractor assembly reciprocably slidable within said housing to and from said face plate, and comprising an interior retractor toward the interior of said door, an exterior retractor slide toward the exterior of said door, and a latching dog disposed in a plane transverse to said locking spindle between said pair of retractor slides, and movably mounted in said exterior retractor slide to be shifted between locking and unlocking positions by relative movement of said slides; a pair of spring means, one for each of said retractor slides for separately urging said retractor slides toward said face plate; a bolt carried on one of said retractor slides and movable therewith between a latching position with said bolt projecting through said bolt opening, and an unlatched position with said exterior retractor slide retracted into said housing against said spring means; dog operating means to move said locking dog from said locking position to said release position when said interior retractor slide is retracted a short distance relative to said exterior retractor slide; mating overlapping shoulder means between said interior retractor slide and said exterior retractor slide transverse to the direction of retraction movement, and spaced from one another sufficiently to permit relative movement of said slides to achieve said dog release movement by said dog operating means.

4. In a door lock set having a pair of knob means for unlatching said lock set, and lock means for locking said door lock set against unlatching; an improved deadlocking door latch mechanism operable by one of said knobs while said door lock set is in a locked condition, which improvement includes: a housing for mounting in said door near the edge thereof; a locking spindle passing transversely through said door at said housing between said pair of knob means; a retractor slide assembly reciprocably slidable within said housing to and from the edge of said door, and comprising a pair of retractor slides coupled to permit partial retraction of one of said slides relative to the other, and a latching dog disposed in a plane transverse to said locking spindle between said pair of retractor slides, and rotatably mounted on one of said retractor slides; spring means for separately urging said retractor slides towards the edge of said door; a face plate closing said housing at the edge of said door, said face plate having a bolt opening; a bolt carried on one of said retractor slides and movable therewith between a latching position with said bolt projecting through said bolt opening, and an unlatched position with said retractor assembly retracted into said housing against said spring means; cam means between said dog and the retractor slide other than that in which said dog is rotatably mounted to rotate said dog from latching to unlatching position upon partial relative retraction movement between said two retractor slides; knob spindle means rotatable with one of said knob means and projecting into said housing; walls defining a retraction cam surface on the other of said retractor slides and engaging said knob spindle means to produce said partial retraction movement between said retractor slides before retraction of the whole of said retractor slide assembly.

5. In a door lock set having interior and exterior knob means for unlatching said lock set, and lock means for locking said door lock set against unlatching by said exterior knob, an improved deadlocking door latch mechanism operable by said interior knob means while said door lock set is in a locked condition, which improvement includes: a housing for mounting in said door near the edge thereof; a locking spindle passing transversely through said door at said housing between said interior and said exterior knob means, said locking spindle being rotatable independently of said interior knob means; a retractor slide assembly reciprocably slidable within said housing to and from the edge of said door, and comprising an interior retractor slide on the side adjacent the interior knob means and an exterior retractor slide on the side adjacent the exterior knob means, and a latching dog disposed in a plane transverse to said locking spindle and between said pair of retractor slides, said dog being rotatably mounted on said exterior retractor slide to rotate into and out of locking engagement with said locking spindle; a pair of spring means, one for each of said retractor slides for separately urging said retractor slides toward the edge of said door; a face plate closing said housing at the edge of said door, said face plate having a bolt opening; a bolt carried on said exterior retractor slide and movable therewith between a latching position with said bolt projecting through said bolt opening, and an unlatched position with said retractor assembly retracted into said housing against said pair of spring means; interior knob spindle means rotatable with said interior knob means and projecting into said housing; walls defining a retraction cam surface on said interior retractor slide and engaging said interior knob spindle means; and coupling means between said interior retractor slide and said exterior retractor slide, one element of said coupling means being spaced from another element of said coupling means permitting said interior retraction slide to be retracted a sufficient distance to rotate said latching dog without movement of said exterior retractor slide.

6. In a door lock set having interior and exterior knob means for unlatching said lock set, and lock means for locking said door lock set against unlatching by said exterior knob, an improved deadlocking door latch mechanism operable by said interior knob means while said door lock set is in a locked condition, which improvement includes: a housing for mounting in said door near the edge thereof; a locking spindle passing transversely through said door at said housing between said interior and said exterior knob means, said locking spindle being rotatable independently of said interior knob means; a retractor slide assembly reciprocably slidable within said housing to and from the edge of said door, and comprising interior and exterior retractor slides coupled to permit partial relative retraction of said interior retractor slide, and a latching dog disposed in a plane tansverse to said locking spindle between said pair of retractor slides; and rotatably mounted in said exterior retractor slide to rotate into and out of locking engagement with said locking spindle; spring means for separately urging said retractor slides towards the edge of said door; a face plate closing said housing at the edge of said door, said face plate having a bolt opening; a bolt carried on said exterior retractor slide and movable therewith between a latching position with said bolt projecting through said bolt opening, and an unlatched position with said retractor assembly retracted into said housing against said pair of spring means; a crank arm extending from said dog; cam means on the end of said crank arm engaging a cam slot in said interior retractor slide, and adapted to rotate said dog from latching to unlatching position upon said partial retraction of said interior retractor slide; interior knob spindle means rotatable with said interior knob means and projecting into said housing; and walls defining a retraction cam surface on said interior retractor slide and engaging said interior knob spindle means to produce retraction of said interior retractor slide upon rotation of said interior knob spindle means.

7. In a door lock set having interior and exterior knob means for unlatching said lock set, and lock means for locking said door lock set against unlatching by said exterior knob, an improved deadlocking door latch mechanism operable by said interior knob means while said door lock set is in a locked condtion, which improvement includes: a housing for mounting in said door near the edge thereof; a locking spindle passing transversely through said door at said housing between said interior and said exterior knob means, said locking spindle being rotatable independently of said interior knob means; a retractor slide assembly reciprocably slidable within said housing to and from the edge of said door, and comprising interior and exterior retractor slides coupled to permit partial relative retraction of said interior retractor slide, and a latching dog disposed in a plane transverse to said locking spindle between said pair of retractor slides, and rotatably mounted in said exterior retractor slide; a pair of spring means, one for each of said retractor slides for separately urging said retractor slides towards the edge of said door; a face plate closing said housing at the edge of said door, said face plate having a bolt opening; a bolt carried on said exterior retractor slide and movable therewith between a latching position with said bolt projecting through said bolt opening, and an unlatched position with said retractor assembly retracted into said housing against said pair of spring means; a detent means on said dog, said detent means being rotatable with said dog between a deadlocking position with said detent means engaged with said locking spindle to prevent unlatching, and an unlatched position with said detent means rotated to clear said locking spindle and permit the retraction of said retractor assembly; a crank arm extending from said dog from the rotatable mounting thereof; cam means on the end of said crank arm engaging a cam slot on said interior retractor slide, and adapted to rotate said dog from latching to unlatching position upon said partial retraction of said interior retractor slide; interior knob spindle means rotatable with said interior knob means and projecting into said housing; walls defining a retraction cam surface on said interior retractor slide and engaging said interior knob spindle means to produce retraction of said interior retractor slide upon rotation of said interior knob spindle means; mating overlapping shoulder means between said interior retractor slide and said exterior retractor slide, transverse to the direction of retraction movement, and spaced from one another sufficiently to permit said partial retraction of said interior retractor slide; and walls defining a cam surface on said locking spindle to guide said detent means on said dog during unlatching retraction movement.

8. A door latch mechanism comprising a housing, an inside knob assembly, and an outside knob assembly rotatably mounted in said housing, a retractor slide assembly comprising a pair of retractor slide members positioned in longitudinally slidable relationship relative to each other, said slide members being located side by side in said housing and adapted to transport a reciprocating latch bolt, said slide members having spring return means acting against movement of said slide members to positions wherein said latch bolt is withdrawn, and roll-back spindles on said knob assemblies in operative engagement with the respective slide members, a locking spindle member extending into said casing from the respective knob assemblies having a locked position and a released position, a deadlocking dog mounted on one of said slide members in position movable relative to said locking spindle between a locked position in engagement with the locking spindle when the locking spindle is in locked position and a released position when said locking spindle is in released position, and trip means on the other of said slide members in operative engagement with said deadlocking dog and adapted to shift said deadlocking dog to released position thereof in response to longitudinal displacement of one of said slide members with respect to the other by rotation of the respective knob assembly.

9. A door latch mechanism comprising a housing, an inside knob assembly, and an outside knob assembly rotatably mounted in said casing, a retractor slide assembly comprising a pair of retractor slide members positioned in longitudinally slidable relationship relative to each other, said slide members being located side by side in said housing and adapted to transport a reciprocating latch bolt, said slide members having spring return means acting against movement of said slide members to positions wherein said latch bolt is withdrawn, and roll-back spindles on said knob assemblies in operating engagement with the respective slide members, a locking spindle member extending into said casing from the respective knob assemblies having a locked position and a released position, a deadlocking dog movable relative to said locking spindle by one of said slide members between a locked position in engagement with the locking spindle when the locking spindle is in locked position and a released position when said locking spindle is in released position, and trip means operable by the other of said slide members in operative engagement with said deadlocking dog and adapted to shift said deadlocking dog to released position thereof in response to longitudinal displacement of one of said slide members with respect to the other by rotation of the respective knob assembly.

10. A door latch mechanism comprising: a housing, an inside knob assembly, and an outside knob assembly rotatably mounted in said casing; a retractor slide assembly comprising a pair of retractor slide members positioned in longitudinally slidable relationship relative to each other, said slide members being located side by side in said housing and adapted to transport a reciprocating latch bolt; spring return means acting against movement of said slide members to positions wherein said latch bolt is withdrawn; roll-back spindles on said knob assemblies in operative engagement with the respective slide members; a locking spindle member extending into said casing from the respective knob assemblies having a locked position and a released position; a deadlocking dog mounted on one of said slide members in position movable relative to said locking spindle between a locked position in engagement with said locking spindle when the locking spindle is in locked position and a released position when said locking spindle is in released position; first trip means on the other of said slide members in operative engagement with said deadlocking dog and adapted to shift said deadlocking dog to released position thereof in response to longitudinal displacement of one of said slide members with respect to the other by rotation of the respective knob assembly; and a second trip means reciprocable in said latch bolt and normally protruding from said latch bolt, said second trip means releasing said deadlocking dog when depressed into said latch bolt.

11. A deadlocking door latch mechanism which includes: a housing for mounting in a door near the swinging edge thereof; a face plate closing said housing at the edge of said door, said face plate having a bolt opening; a locking spindle passing transversely through said door and said housing between the interior and exterior sides thereof, said locking spindle being rotatable between locking and unlocking positions; a retractor slide assembly reciprocably slidable within said housing to and from said face plate, and comprising an interior retractor slide toward the interior of said door, an exterior retractor slide toward the exterior of said door, and a deadlocking dog rotatable in a plane transverse to said locking spindle between said pair of retractor slides, said deadlocking dog being pivotally mounted in said exterior retractor slide and in deadlocking engagement with said locking spindle when the latter is in locked position; spring means separately urging each of said retractor slides toward said face plate; a bolt carried on one of said retractor slides and movable therewith between a latching position with said bolt projecting through said bolt opening, and an unlatched position with said retractor assembly retracted into said housing against said spring means; a first dog-operating means reciprocable in said latch bolt between an inoperative position protruding from said latch bolt and a dog releasing position when depressed inwardly with respect to said housing; a second dog-operating means on said interior retractor slide to rotate said locking dog from deadlocking position to release position when said interior retractor slide is retracted a short distance relative to said exterior retractor slide; mating overlapping shoulder means between said interior retractor slide and said exterior retractor slide transverse to the direction of retraction movement, and spaced from one another sufficiently to permit said relative longitudinal movement; and interior spindle means operable from inside said door and adapted to retract said interior retractor slide to unlatching position.

References Cited by the Examiner
UNITED STATES PATENTS

| | | | |
|---|---|---|---|
| 63,230 | 3/67 | Dickson | 70—150 |
| 1,566,575 | 12/25 | Best | 70—150 |
| 2,558,509 | 6/51 | Cerf | 292—164 |
| 2,742,310 | 4/56 | Russell | 29—169 |

M. HENSON WOOD, JR., *Primary Examiner.*